(12) United States Patent
Di et al.

(10) Patent No.: US 10,298,701 B2
(45) Date of Patent: May 21, 2019

(54) SYSTEMS AND METHODS FOR TIMELY PROPAGATION OF NETWORK CONTENT

(71) Applicant: Microsoft Technology Licensing, LLC, Redmond, WA (US)

(72) Inventors: Wei Di, Cupertino, CA (US); Ho jeong Kim, Belmont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 410 days.

(21) Appl. No.: 15/010,714

(22) Filed: Jan. 29, 2016

(65) Prior Publication Data
US 2017/0223122 A1    Aug. 3, 2017

(51) Int. Cl.
*G06Q 50/00* (2012.01)
*H04L 29/08* (2006.01)

(52) U.S. Cl.
CPC ............ *H04L 67/22* (2013.01); *G06Q 50/00* (2013.01); *G06Q 50/01* (2013.01); *H04L 67/10* (2013.01)

(58) Field of Classification Search
CPC .... G06Q 50/01; G06Q 30/0269; G06Q 50/00; H04W 4/21; H04L 67/10; H04L 67/22
USPC ........................................................ 709/204
See application file for complete search history.

(56) References Cited

U.S. PATENT DOCUMENTS

| | | | |
|---|---|---|---|
| 2011/0307551 A1 | 12/2011 | Danezis et al. | |
| 2013/0086170 A1* | 4/2013 | Skelton | G06Q 30/00 709/204 |
| 2013/0091147 A1* | 4/2013 | Kim | G06Q 30/00 707/748 |
| 2013/0340089 A1* | 12/2013 | Steinberg | H04L 63/10 726/27 |
| 2014/0149510 A1 | 5/2014 | Sundaresan et al. | |
| 2014/0244612 A1 | 8/2014 | Bhasin et al. | |
| 2015/0006242 A1 | 1/2015 | Bhasin et al. | |
| 2015/0026604 A1* | 1/2015 | Mulukuri | G06Q 50/01 715/758 |
| 2015/0149373 A1* | 5/2015 | Chhaya | G06Q 30/0282 705/319 |

(Continued)

OTHER PUBLICATIONS

"International Application Serial No. PCT/US2017/015318, International Search Report dated Mar. 23, 2017", 5 pgs.

(Continued)

*Primary Examiner* — Davoud A Zand
(74) *Attorney, Agent, or Firm* — Hickman Palermo Becker Bingham LLP

(57) ABSTRACT

A content propagation system includes processors, memory storing user activity data and interaction data on a social network, and a content propagation engine configured to receive an indication of a share event from the sharing user, the share event including a content item, identify a plurality of target users for the share event, identify a plurality of time blocks, compute an activity value for each target user of the plurality of target users, and for each time block of the plurality of time blocks, the activity value is based on the user activity data, compute an engagement value for each target user based at least in part on the interaction data, determine a share time based at least in part on the plurality of activity values and the plurality of engagement values, and publish the content item to the plurality of target users at the share time.

20 Claims, 8 Drawing Sheets

(56) References Cited

U.S. PATENT DOCUMENTS

| | | | |
|---|---|---|---|
| 2015/0215349 A1* | 7/2015 | Sherman | H04L 65/403 |
| | | | 709/204 |
| 2015/0324361 A1* | 11/2015 | Glass | G06F 17/3053 |
| | | | 707/748 |
| 2015/0375104 A1 | 12/2015 | Nishar et al. | |
| 2016/0080485 A1* | 3/2016 | Hamedi | H04L 67/02 |
| | | | 709/204 |
| 2017/0212664 A1* | 7/2017 | Ghadiyali | H04L 67/10 |

OTHER PUBLICATIONS

"International Application Serial No. PCT/US2017/015318, Written Opinion dated Mar. 23, 2017", 6 pgs.

* cited by examiner

SYSTEMS AND METHODS FOR TIMELY PROPAGATION OF NETWORK CONTENT

TECHNICAL FIELD

This application relates generally to the technical field of content publication in a social network and, in one specific example, to systems and methods for timed propagation of network content.

BACKGROUND

Some social networking sites enable users to "share" publications or other network content with other users of the networking site. Each user, or "sharing user", may have one or more direct connections, or "first-degree connections", with other users within the social network. The social network site may enable the sharing user to identify content items for sharing with their own network (e.g., their first-degree connections). Once shared, the first-degree connections, or "receiving users", may be presented with the shared content items through the social network site.

BRIEF DESCRIPTION OF THE DRAWINGS

Some embodiments are illustrated by way of example and not limitation in the figures of the accompanying drawings.

DETAILED DESCRIPTION

Figure 1:
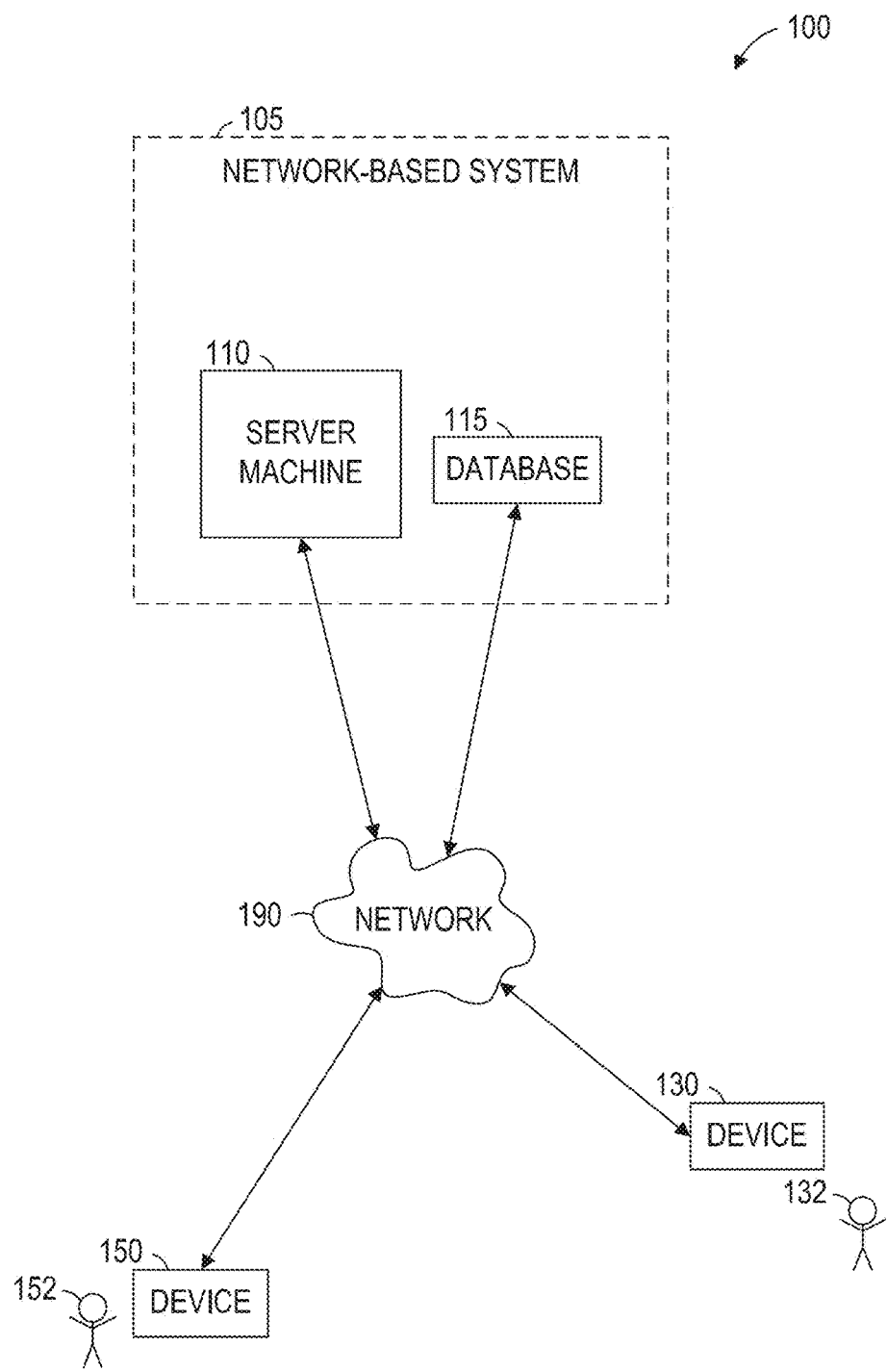
FIG. 1 is a network diagram illustrating a network environment suitable for a social network service implementing a content propagation engine (not separately shown in FIG. 1), according to some example embodiments.

Example methods and systems are directed to techniques for providing publications in a social network system. More specifically, in one example embodiment, methods, systems, and computer program products are provided for timed propagation or delivery of network content, such as content items on a social networking site. The social network system provides members an easy way to discover relevant and insightful content within topics of interest, and then share that content to their social network (e.g., their first-degree connections). Network content (e.g., a content item of interest to the "sharing user") may be designated by the sharing user for propagation to that user's social network (e.g., one or more "receiving users"). The shared content item may be, for example, an original content item (e.g., content generated or imported by the sharing user), or may be a redistribution of an existing content item (e.g., clicking on "share" for a content item posted or otherwise shared by another user).

Users login to the social network system at various times throughout their day or week, sometimes sporadically, but often with a regular pattern. For example, some users may routinely login to the social network system first thing upon arriving at the office, or during their lunch break, or in the evening at the end of their day.

When the user logs in, the social network system may display content items to the user through their "news feed", which may be a customized list of content items (and associated images, links, text, buttons, and so forth). At least some of these content items may be user-shared content items (e.g., content items shared with this user by one of their connections). Further, some of these content items may be ordered temporally based on when they were shared by the sharing user. For example, content items more recently shared with this user may appear higher in the news feed, and thus may be more likely to be viewed or consumed by the user. Similarly, content items that were shared farther in the past may be more likely to appear lower in the list, and thus may be less likely to be viewed or consumed by the user.

A content propagation engine is described herein. The content propagation engine operates within the social network system and manipulates sharing events between a sharing user and one or more receiving users, or "target users". In one example embodiment, the sharing user designates a content item for sharing with their social network (e.g., their first-degree connections, or a particular identified group of users). The content propagation engine determines a "share timing" (or "share time"), a time at which the content item is published or shared with the target users. In other words, the user initiates, instigates, or otherwise submits a "share event" for the content item (e.g., by clicking "share" on the content item), and the content propagation engine determines when to execute that share event (e.g., at what time to provide the content item as a shared content relative to the target users).

To determine the share time, the content propagation engine evaluates two primary factors. First, the content propagation engine evaluates the activity patterns of the target users. As mentioned above, the various receiving users or target users may log onto the social network system at different times, but often login at recurring times. As such, to enhance the visibility of the shared content item to the target users, the content propagation engine determines the share time such that the content item is shared with the target users when the target users are most likely to be logged into or about to log into the social network system. In other words, the content propagation engine evaluates when is a more advantageous time to share the content item with the pool of target users, based on when most of the target users are likely to be active.

Second, the content propagation engine also evaluates the engagement level, or the likelihood that each particular target user is to engage with the content item. Some target users may be less likely to engage based on various factors. For example, some target users may be less active and thus unlikely to engage in any content item, or some target users may be less interested in the subject matter of the shared content item, or some target users may be less likely to engage with content items shared by this particular sharing user. As such, the content propagation engine factors in this likelihood to engage when determining the share time. For example, the content propagation engine may reduce or weight the activity pattern factor for each target user based on the likelihood to engage.

Accordingly, the content propagation engine determines the share time based on the pool of target users, then executes the share event for the content item at the share time. As such, the visibility of the content item within the pool of target users is enhanced by providing the content item timely with target user activity (e.g., just before most of the target users normally log on) and likelihood to engage (e.g., adjusted to favor those for which the content is more relevant).

Examples provided herein merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

FIG. 1 is a network diagram illustrating a network environment 100 suitable for a social network service implementing a content propagation engine (not separately shown in FIG. 1), according to some example embodiments. The network environment 100 includes a server machine 110, a database 115, a first device 130 for a first user 132, and a second device 150 for a second user 152, all communicatively coupled to each other via a network 190. The server machine HO and the database 115 may form all or part of a network-based system 105 (e.g., a cloud-based server system configured to provide one or more services to the devices 130 and 150) that may also provide the skills analysis engine described herein. The database 115 can store member data (e.g., profile data, social graph data) for the social network service. The server machine 110, the first device 130, and the second device 150 may each be implemented in a computer system, in whole or in part, as described below with respect to FIG. 5.

Also shown in FIG. 1 are the users 132 and 152. One or both of the users 132 and 152 may be a human user (e.g., a human being), a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

Any of the machines, databases 115, or devices 130, 150 shown in FIG. 1 may be implemented in a general-purpose computer modified (e.g., configured or programmed) by software (e.g., one or more software modules) to become a special-purpose computer configured to perform one or more of the functions described herein for that machine, database 115, or device 130, 150. For example, a computer system able to implement any one or more of the methodologies described herein is discussed below with respect to FIG. 5. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases 115, or devices 130, 150 illustrated in FIG. 1 may be combined into a single machine, database 115, or device 130, 150, and the functions described herein for any single machine, database 115, or device 130, 150 may be subdivided among multiple machines, databases 115, or devices 130, 150.

The network 190 may be any network that enables communication between or among machines, databases 115, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

In the example embodiment, the network-based system 105 provides content propagation services to the users 132, 152 of the social network service. The users 132, 152 may be members of the social network service and, in some embodiments, may be a sharing member (e.g., members that share content items on the social network service), or target members (also referred to herein as receiving members, e.g., first-degree connections of the sharing member). The content propagation engine described herein may, thus, provide content sharing between the sliming member (e.g., user 132) and the target members (e.g., the users 152).

Figure 2:
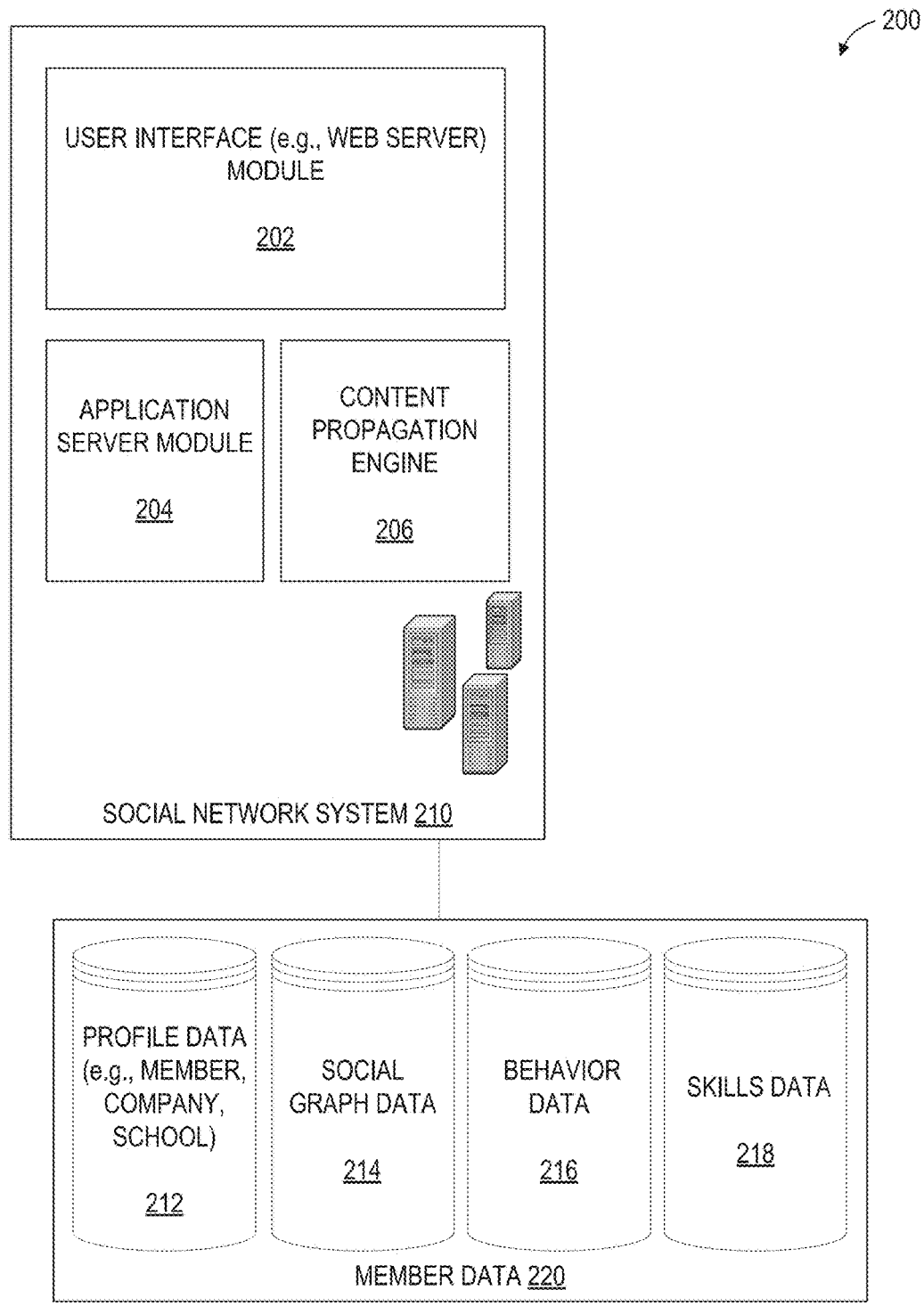
FIG. 2 is a block diagram illustrating components of an example social network system providing a social network, according to some example embodiments.

FIG. 2 is a block diagram illustrating components of an example social network system 210 providing a social network 200, according to some example embodiments. The social network system 210 is an example of the network-based system 105 of FIG. 1. The social network system 210 includes a user interface module 202, an application server module 204, and a content propagation engine 206, all configured to communicate with each other (e.g., via a bus, shared memory, a communications network, or the like).

The social network 200 and the social network system 210 (e.g., as provided by the network-based system 105) may provide a broad range of applications and services (the "social networking service(s)") that allow members (e.g., users 132 and 152) the opportunity to share and receive information, often customized to the interests of the targeted member. For example, the social networking service may include a photo sharing application that allows members to upload and share photos with other members. In some example embodiments, members may be able to self-organize into groups (e.g., interest groups) organized around a subject matter or topic of interest, or some of the social networking services may host various job listings providing details of job openings with various organizations (e.g., companies).

The social network system 210 communicates with the database 115 of FIG. 1, such as a database storing member data 220, and a database storing user summary information 230 and historic content engagement information 240. The member data 220 can include profile data 212 (e.g., the member's employer, position, educational information, and so forth), social graph data 214 (e.g., contacts and connections with other members), behavior data 216 (e.g., actions performed within the social network, such as in-network mail, or interactions with in-network advertisements or content items), and skills data 218 (e.g., job skills information, job descriptions of past and current employment positions, and so forth).

As shown in FIG. 2, the database 115 can include several databases for member data 220. The member data 220 includes a database for storing the profile data 212, including both member profile data and profile data for various organizations. Additionally, the member data 220 can store the social graph data 214, the behavior data 216, and the skills data 218. Further, the database 115 may also store the user summary information 230 and/or the historical content engagement information 240.

The profile data 212 can include member attributes used in providing leads by the lead generation module 206. For instance, with many of the social network services provided by the social network system 210, when a user 132, 152 registers to become a member, the member is prompted to provide a variety of personal and employment information to be displayed in the member's personal web page. Such information is commonly referred to as member attributes. The member attributes that are commonly requested and displayed as part of a member's profile includes the member's age, birthdate, gender, interests, contact information, residential address, home town and/or state, spouse and/or family members, educational background (e.g., schools, majors, matriculation and/or graduation dates, etc.), employment history, office location, skills, professional organizations, and so on. In some embodiments, the member attributes may include the various skills that each member has indicated he or she possesses. Additionally, the member attributes may include skills for which a member has been endorsed.

With certain social network services, such as some business or professional network services, the member attributes may include information commonly included in a professional resume or curriculum vitae (CV), such as information about a person's education, the company at which a person is employed, the location of the employer, an industry in which a person is employed, a job title or function, an employment history, skills possessed by a person, professional organizations of which a person is a member, and so on.

Some of these member attributes may also be included as a part of skills data 218 (e.g., skills provided directly by the member), while other skills data 218 may be provided from other sources (e.g., skills for which the member has been endorsed, skills derived by the social network system 210 from job descriptions provided by the member for current and past employment, resume, CV, and so forth). Skills data 218 includes titles of skills for which the member is somehow associated (e.g., through past employment experience with the skill, through skills endorsements, and so forth). For purposes of the present disclosure, skills data 218 is presumed present, however received, entered, derived, or otherwise acquired.

Another example of the profile data 212 can include data associated with a company page. For example, when a representative of an entity initially registers the entity with the social network service, the representative may be prompted to provide certain information about the entity. This information may be stored, for example, in the database 115 and displayed on an entity page.

Additionally, social network services provide their users 132, 152 with a mechanism for defining their relationships with other people. This digital representation of real-world relationships is frequently referred to as a social graph.

In addition to hosting a vast amount of social graph data 214, many of the social network services offered by the social network system 210 maintain behavior data 216. The behavior data 216 can include an access log of when a member has accessed the social network system 210, profile page views, entity page views, newsfeed postings, interactions with target offerings (e.g., presentations of advertisements to the member), and clicking on links on the social network system 210. For example, the access log can include the last logon date, the frequency of using the social network system 210, and so on.

Additionally, the behavior data 216 can include information associated with applications and services that allow members the opportunity to share and receive information, often customized to the interests of the member. In some embodiments, members may be able to self-organize into groups, or interest groups, organized around subject matter or a topic of interest.

Any one or more of the modules or engines described herein may be implemented using hardware (e.g., one or more processors of a machine) or a combination of hardware and software. For example, any module or engine described herein may configure a processor (e.g., among one or more processors of a machine) to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database 115, or device 130, 150 may be distributed across multiple machines, databases 115, or devices 130, 150.

As will be further described below, the content propagation engine 206 provides content propagation services to the users 132, 152 (e.g., members) in the social network system 210 and associated services.

Figure 3:
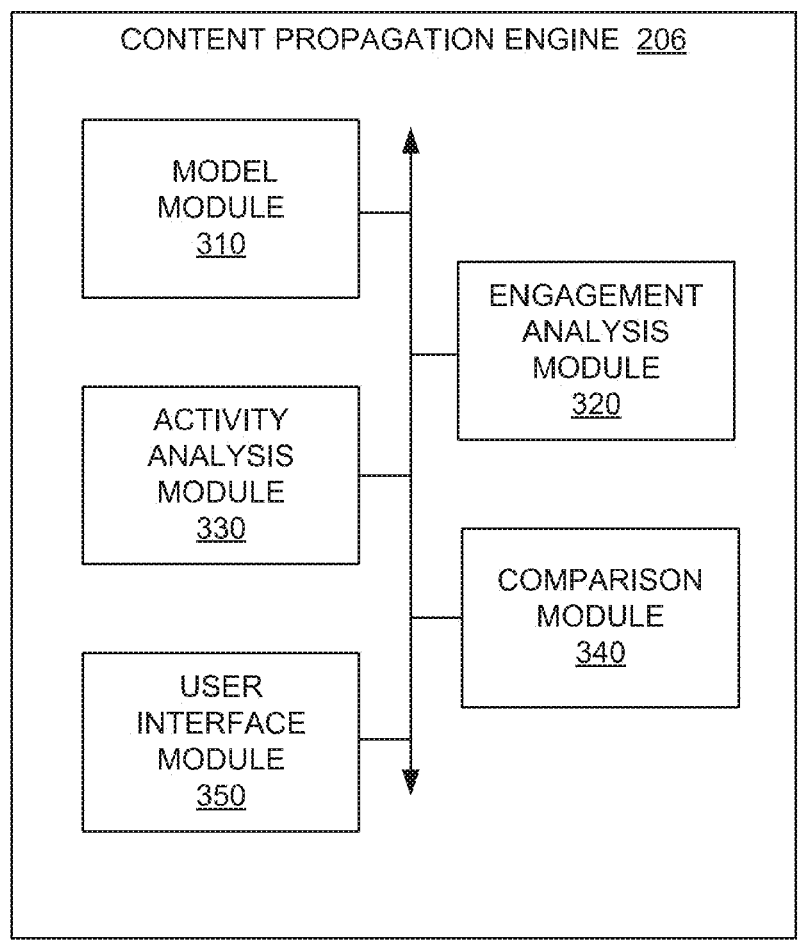
FIG. 3 is a diagram of the example content propagation engine shown in FIG. 2.

FIG. 3 is a diagram of the example content propagation engine 206 shown in FIG. 2. For a particular share event (e.g., a user sharing a content item with their first-degree connections, or the "target users"), the content propagation engine 206 determines when to execute the share event (a "share time", e.g., when to publish the content item as "shared" by the sharing user to the first-degree connections, such as to maximize likelihood of user engagement with the shared content item). To determine the share time, the content propagation engine 206 evaluates two primary factors for the share event: (1) an "activity factor" (e.g., when the target user is more or less likely to be logged onto the social media system based on their historical logon activity); and (2) an "engagement factor" (e.g., each target user's likelihood to engage with the shared content item from this sharing user). In the example embodiment, the content analysis engine 206 includes a model interface module 310, an engagement analysis module 320, an activity analysis module 330, a comparison module 340, and a user interface module 350.

Regarding the engagement factor, the model module 310 builds models for the content propagation engine 206, as well as applies inputs to the models to generate outputs. More specifically, the model module 310 builds a model to evaluate the potential of a particular target user to engage with a content item shared by a particular sharing user. In one example embodiment, the model module 310 builds or "trains" a Random Forest regression model using a "training set" of data that includes groups of raw feature information about the sharing user and the target user, such as shared posting information (e.g., titles, descriptions, and content from content items shared by the users), profile information (e.g., for both sharing user and target user), and common engagement or interaction events between the two users. This model training process includes various aspects of feature collection and feature engineering to prepare the training set. Model building is described in greater detail with regard to FIG. 5 below. Application of the model is described in greater detail with regard to FIG. 6 below.

Once the model is built with the training data (e.g., data for and between training users the engagement analysis module 320 applies the model based on a "current sharing event" involving a current sharing user, a current set of target users (e.g., the current sharing user's first-degree connections), and for a current content item (e.g., the content item being shared by the current sharing user). In other words, the engagement analysis module 320 identifies the input data for the current sharing user, the current set of target users, and the current content item, and executes the model using that input data. The input data for the current sharing event may be any of the same data that is used to build the model. Further, any of the applicable feature collection and feature engineering aspects mentioned with respect to the training set may be performed on the input data for the current sharing user, the current set of target users, and/or the current content item.

More specifically, for the current sliming event, the engagement analysis module 320 applies the model to one or more pairs of users, each pair including the current sharing user and one of the target users from the current set of target users. For example, if the current sharing user is identified by "A", and the current set of target users are identified by "B1, B2, . . . , Bn", where n is the number of target users in the set, then the model is applied n times, for pairs (A, B1), (A, B2), . . . , (A, Bn). Each application of a pair to the model includes identifying the input information for the pair, and applying that input information to the model to generate a resultant "engagement value" for the pair. For example, the engagement value for target user Bn may represent a probability of how likely target user Bn is to engage with the content item based on this share event. In the example embodiment, timing is determined by the activities of each first degree connection, Bx, during each hour of the day. The model's score is the likelihood of Regarding the activity factor, the activity analysis module 330 evaluates the logon activity of each of the target users associated with this share event. The various target users may log onto the social network system at different times, but often login at recurring times. The activity analysis module 330 examines the historical activity data of the target users (e.g., the logon times over a pre-determined period) to generate one or more activity values for each target user, and for one or more time slots. Activity analysis and time slots are described in greater detail below with respect to FIG. 6.

The comparison module 340 uses both the engagement values generated by the engagement analysis module 320 and the activity values generated by the activity analysis module 330 to determine the share time, or the time at which to execute the share event for the content item. The determination of the share time is described in greater detail below with respect to FIG. 6.

Figure 4:
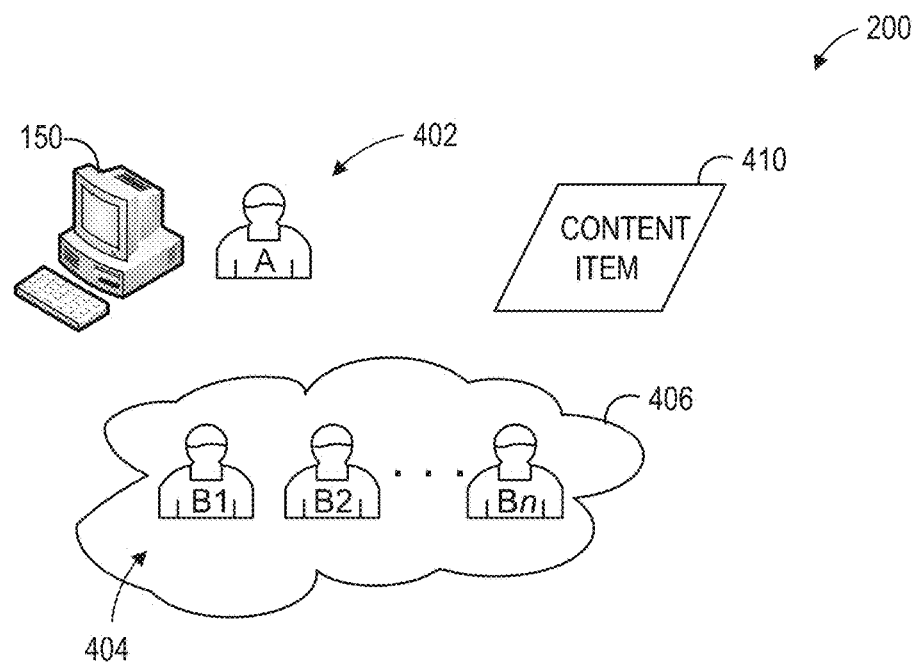
FIG. 4 illustrates an example sharing event for a content item between a sharing user and multiple receiving users, or target users within the social network.
Figure 4:
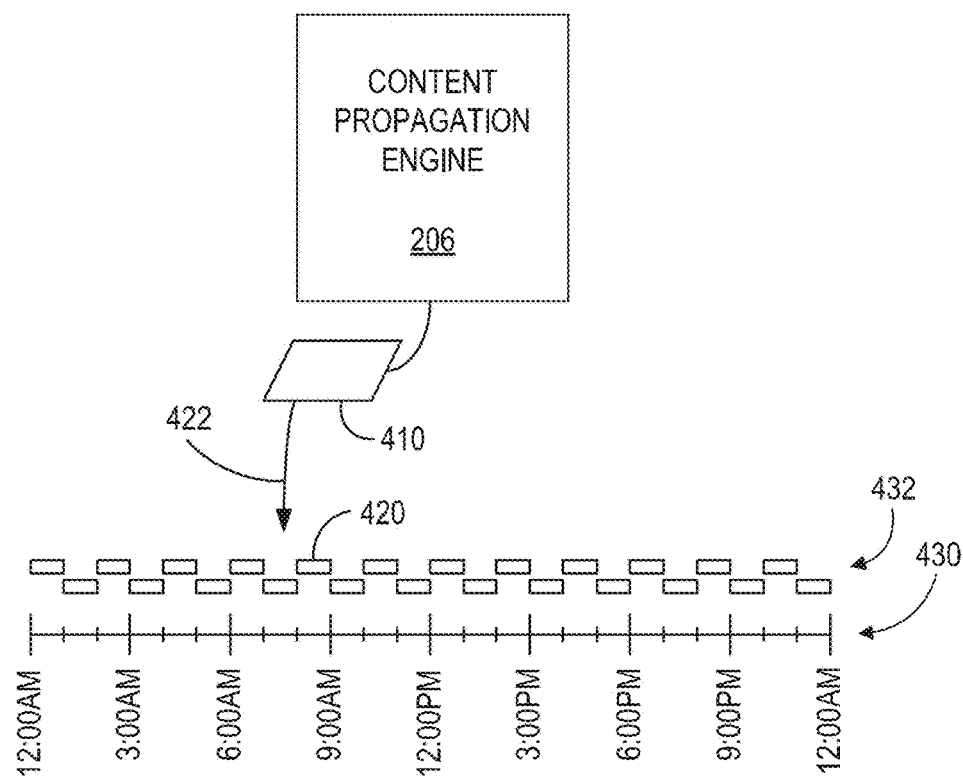

FIG. 4 illustrates an example sharing event for a content item 410 between a sharing user 402 and multiple receiving users, or target users 404 within the social network 200. In the example embodiment, the sharing user 402 (e.g., using the user device 150) selects the content item 410 for sharing through the social network 200. The target users 404 may be identified as a sharing group 406 for purposes of this sharing event. The sharing group 406 may be identified by the sharing user 402 (e.g., selecting a group or community within the social network 200), or by the social network system 210 (e.g., the first-degree connections of the sharing user 402). The sharing group 406 of target users 404 represents the set of users with which the content item 410 will be shared.

A timeline 430 is shown in FIG. 4. The timeline 430 illustrates a 24-hour period, from 12:00 AM on the far left, to 12:00 AM on the far right. The content propagation engine 206 is configured to analyze activity of the target users 404 based on the timeline 430 and, more particularly, based multiple time blocks 432. In the example embodiment, each time block 432 represents a one-hour period of time (e.g., of the timeline 430). The content propagation engine 206 analyzes activity for each target user 404 by time block 432 to determine a target time block 420. The target time block 420 may represent, for example, the time block 432 within which most of the target users 404 who are most likely to engage with the content item 410 may be active on the social network 200 (e.g., to maximize exposure of the target users 404 to the content item 410). The content propagation engine 206 then determines a share timing (or share time) 422, or a time at which to execute the share event for the content item 410 with the target users 404. The share time 422 may be during the target time block 420 (e.g., at 8:15 AM, or 8:30 AM), or right at the start of the target time block 420 (e.g., at 8:00 AM), or at a pre-determined amount of time prior to the start of the target time block 420 (e.g., 10 minutes before 8:00 AM).

Figure 5:
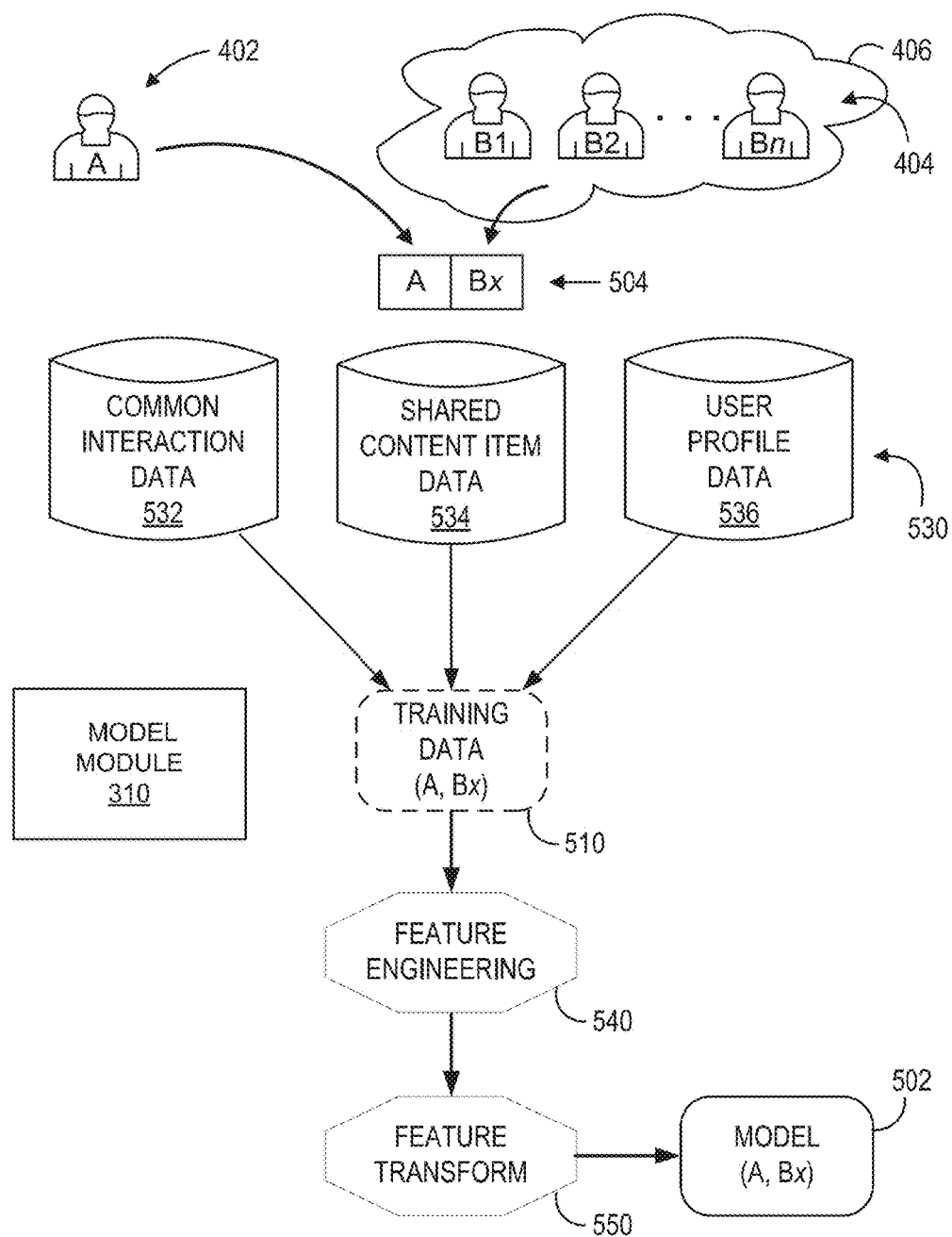
FIG. 5 is a data flow diagram illustrating the model module constructing (or "training") engagement models (or just "model") from a set of training data (e.g., from the social network system) for the sharing user and the target users of the sharing group.

FIG. 5 is a data flow diagram illustrating the model module 310 constructing (or "training") engagement models (or just "model") 502 from a set of training data 510 (e.g., from the social network system 210) for the sharing user 402 and the target users 404 of the sharing group 406. The models 502, once built, may be used by the model module 310 or, more broadly, the content propagation engine 206, to determine engagement factors for each of the target users involved in the sharing event illustrated in FIG. 4. For ease of discussion, the sharing user 402 may be identified as "A", and each of the target users 404 may be individually identified as "B1", "B2", . . . , "Bn", where n is the number of target users in the set 406.

The model module 310 builds a model 502 for each "target pairing" 504 between the sharing user 402 "A" and each of the target users 404 "B1" ... "Bn" (e.g., pairs (A, B1), (A, B2), ..., (A, Bn)). In the example shown in FIG. 5, the target pairing 504 includes the sharing user 402 "A" 402 and the target user 404 "Bx" (where x identifies one of the target users 404). When constructing a particular model 502 for each particular target pairing (e.g., for the target pairing 504 (A, Bx)), the model module 310 identifies training data 510 for that target pairing 504.

Various databases 530 may be used as sources of training data 510 to construct the model 502. In the example embodiment, the databases 530 include common interaction data 532, shared content item data 534, and user profile data 536. The common interaction data 532 includes data involving common interactions between the pair of users "A" and "Bx". For example, common interactions data 532 may include the number of engagements of Bx for A's shared content items (e.g., the number of times Bx has clicked on posts shared by A), or the number of endorsements between A and Bx (e.g., the number of skills A has endorsed for Bx, or vice versa), or the common connections between A and Bx (e.g., shared first-degree connections in their personal networks). Two users of the social network that are more engaged with, or close to, or familiar with each other (e.g., via endorsing, or common connections, or based on past shared articles) tend to suggest that one may be more likely to engage with content items shared by other. In some embodiments, the user profile data 536 may be similar to the profile data 212 and/or the skills data 218, and the common interaction data 532 and the shared content item data 534 may be similar to the behavior data 216 and/or the social graph data.

In the example embodiment, the shared content item data 534 includes data associated with content items shared by the sharing user 402. For example, the shared content item data 534 may include titles and/or descriptions from content items shared by the sharing user 402 A, then reshared by the user 404 Bx. Using such text information serves to enable distinguishing between Bx's familiarity with A (A as a potential "influencer" of Bx, e.g., Bx might have a tendency to engage with whatever A shares) and Bx's subject matter interest in the content item (e.g., based on similarity to their profile). For example, if Bx has a technical background in automobile repair, and A shares an article talking about the most recent development if self-driving cars, then Bx is more likely to re-share it (e.g., based both on familiarity with A and on subject matter interest). Similarly is shares are from influencer A, or the share is from certain popular median website (e.g., an influencer source), then Bx is more likely to reshare. Some such impacts are not necessarily based on the relationship between A and Bx. However, because the total re-share of Bx vs. A (e.g., as the target value) is calculated, then potentially Bx may have a larger result that includes content items having been influenced less by Bx's likelihood of re-sharing A's share purely based on the A/Bx relationship. By including these variables/features in the predictor, it helps the model to offset such cases, to push the model to more accurately capture the engagement of Bx vs. A regardless of the content (e.g., reducing the impact of subject matter interest of Bx). In other words, the model built here is more focused on just the personal interaction of A and Bx.

The user profile data 536 includes profile information for both the sharing user 402 A, and the target user 404 Bx. Two users of the social network that are similar to each other (e.g., similar professional paths, positions, activities, or interests) tend to suggest that one may be more likely to engage with content items shared by the other. The user profile data for either or both users in the target pairing 504 may include:

First/Last Name Exist
Headline Exists
Industry Information Exist
Location information Exist
Number of Positions
Number of Skills
Number of Education/Education Level
Number of Languages
Number of Certificates
Number of Publications
Number of Patents, Projects, Organizations, Courses Taken
Number of Honors, Volunteer Experiences, Test Scores
Title
Headline
Summary
Current Position:Length
Industry ID
Function Names
Seniority Names
Company Size, Type, Age, Tag, Public/Private
Total Positions, Average Position Length, Career Length
School Information, Education Date, Degree Information
Skills, Total Number of Skills
Channels, Total Number of Channels Followed
Joint Groups, Total Groups
Incoming Connections, Outgoing Connections
Age
Total Personal Engagement Some such factors may be used to determine the completeness of the profile of Bx as an indicator of the overall activity level on the social network. Further, for each user Bx, he/she may have a base activity level that may be an important factor to predict whether Bx has any possibility to engage in the activities of others.

Each of the elements of training data 510 represent raw features used to build the model 510. The model module 310 performs feature engineering 540 on some or all of the features of the training data 510. For example, some features may be transformed into feature types including categorical, binary, numerical values, or text. Categorical feature transformation includes "bining" features into a few categories (e.g., to help reduce the dimensionality of the data, filtering outliers, and dealing with data sparsity). For example, the "Number of Positions" feature may be distilled to a fixed number of bins, such as:

TABLE 1

Categorical Bining of Example Feature

| Bin ID | Number of Positions |
|---|---|
| A | <5 or Unknown |
| B | 5-10 |
| C | 11-20 |
| D | 21+ |

Some features may be distilled to a binary value. For example, the "First/Last Name Exist" feature may be set to 0 if the user has no First Name or Last Name defined in the social network 200, and 1 otherwise.

For some numerical features, the absolute value is significant to reflect certain characteristics. As such, the numerical feature may be retained or computed and used as the feature. For example, the total number of times that A has been endorsed by Bx may be used as a numerical feature (e.g., an endorsement ratio, or a mutual endorsement ratio), or shared posts domain importance (e.g., the domains of shared article links). In one embodiment, the domains of the most shared links may be determined from shared article URLs (e.g., www.usatoday.com, www.cnn.com). This type of feature (e.g., related to source popularity) may be incorporated into the model to discount these types of factors, thereby narrowing focus on Bx's engagement with A as opposed to Bx's affinity for popular sources of content. User-to-user affinity may be more stable over time as compared to source affinity or subject matter affinity.

For other numerical features, the numerical feature may be altered, or various raw features may be used to compute a feature used to build the model 502 (e.g., in lieu of, or in addition to, the raw feature(s)). For example, a mutual endorsement ratio may be computed based on certain raw features of users A and Bx. The model module 310 may construct a list, $e_1$, of A's endorsements given to Bx:

$$e_1 = \{j_1, j_2, \ldots, j_n\},$$

where each $j_x$ is a particular endorsement of A given to Bx. Further, the model module 310 may construct a list, $e_2$, of Bx's endorsements given to A:

$$e_2 = \{i_1, i_2, \ldots, i_m\},$$

where each $i_x$ is a particular endorsement of Bx given to A. From these two lists, the model module 310 may compute a mutual endorsement ratio, $\tau_{me}$, using Jaccard similarity coefficient as:

$$r_{me} = \frac{\text{intersect}(e_1, e_2)}{(\|e_1\| + \|e_2\| - \text{intersect}(e_1, e_2))}.$$

Some features of the training data 510 are retained as raw text. Further, such raw text features may be pre-processed by various means, such as converting to all lower-case letters, filtering out "stop words", and performing stamping. For example, a Headline feature of "Head of Search Science Engineering at ACME Labs" may become "head search science engineering acme lab".

After feature engineering 540, the training data 510 undergoes feature transformation 550. In the example embodiment, the model module 310 builds a Term Frequency-Inverse Document Frequency (TF-IDF) model for text-based features. The model module 310 loops through available data, treating each of the text features as a document. A TF-IDF model is built using the text features and, more specifically, unigrams and bigrams from each of the text features. All of the resultant unigrams and bigrams then become the "dictionary pool" for the TF-IDF model, where each distinct unigram or bigram becomes a dictionary term. In some embodiments, some rare terms are removed from or otherwise not included in the dictionary pool (e.g., terms occurring 5 times or fewer may be removed). Once the dictionary pool of terms is identified, the model module 310 uses TF-IDF to build its weights, where each weight is a statistical measure used to evaluate how significant the term is within a document relative to the collection or corpus. The importance increases proportionally based on the number of times the term appears in the document, but is offset by the frequency of the term in the corpus. The TF-IDF weight is composed by two values. The first value is the normalized term frequency (TF) (e.g., the number of times a word appears in a document, divided by the total number of words in that document). In other words, TF measures how frequently the term occurs in the document. Since every document is different in length, it is possible that a term would appear many more times in a longer document than a shorter one. Thus, the term frequency is divided by the document length (e.g., the total number of terms or words in the document, as a means for normalization). The second value is the inverse document frequency (IDF) (e.g., the logarithm of the number of documents in the corpus divided by the number of documents where the specific term appears). IDF measures how important a term is. Under unmodified TF, all terms are considered equally important. However, certain terms such as "is", "of", and "that" may appear numerous times, but have little importance (e.g., to document relevance to the user 420). As such, IDF reduces the weight of the frequent terms while increasing the weight of the rare terms.

Further, feature transformation 550 also includes converting all the features into a sparse vector (not separately shown), or a list of (key, value) pairs. For example, the total dictionary may consist of thousands of words. When this model is applied to a headline of A (e.g., a data scientist), only those two words may have non-zero values, and entries in the full vector that correspond to all the other words in the dictionary would be zero. After these transformations, the original features have now become a sparse vector, where the sparsity is introduced by the TF-IDF model.

In the example embodiment, training of the model 510 is a supervised approach. In other words, for each target pair 504, the model module 310 receives or computes a response value used for the target pairing 504 when building the model 502, where the response value indicates an amount of engagement based on the (A, Bx) target pair 504. In the example embodiment, the response value is computed by collecting the total amount of shares performed by Bx that were originally shared by A (e.g., over a historical period). The more Bx re-shares A's content tends to indicate that Bx is more likely to engage with A's content. In other embodiments, the amount of engagement may include one or more of re-sharing, "liking" content, consuming content (e.g., reading or watching content), or commenting on content.

With the vectors for each target pairing 504 and their associated response values, the model module 310 trains the models 502 for the target users 404. In the example embodiment, the model module 310 uses Random Forest regression (e.g., "randomForest" package in the spark programming language). The model 510, when given similar input data for a target pair such as the target pair 504 (A, Bx), is configured to generate an "engagement value" for the target pair 504. Use of this engagement value is described below with respect to FIG. 6.

Figure 6:
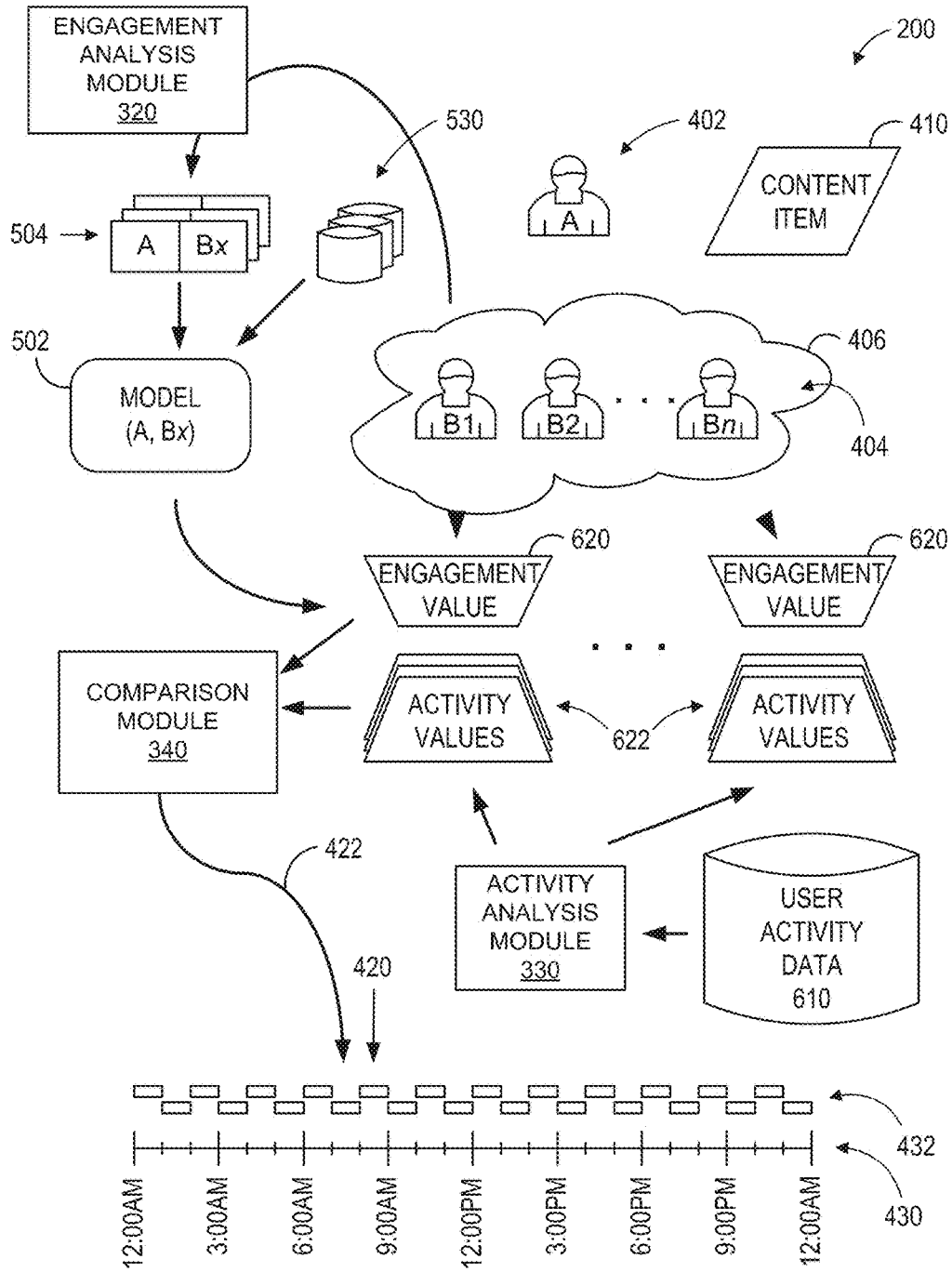
FIG. 6 is a data flow diagram illustrating the content propagation engine determining a share time for the sharing event for the content item, and as between the sharing user "A" and the pool of target users "B1" to "Bn".

FIG. 6 is a data flow diagram illustrating the content propagation engine 206 determining a share time 602 for the sharing event for the content item 410, and as between the sharing user 402 "A" and the pool 406 of target users 404 "B1" to "Bn". FIG. 6 illustrates both the calculation of engagement values 620 for target pairings 504 using the model 502, as well as calculation of activity values 622 for each target user 404. The engagement values 620 serve as the engagement factor, and the activity values 622 serve as the activity factor. The content propagation engine 206 then determines a target time block 604 that can provide enhanced visibility of the content item 410 to the pool 406 of target users 404 (e.g., when most of the target users 404 are likely to be on, as weighted by their likelihood to engage). Once the target time block 604 is identified, the content propagation engine 206 determines the share time

602, or the specific time at which to execute the share event (e.g., just before, or near the beginning of the target time block 604).

Regarding the engagement factor, and as mentioned above, the engagement analysis module 320 applies pairings 504 to the model 502 to generate an engagement value 620 for each of the target users 404. More specifically, the engagement analysis module 320 identifies multiple pairing 504, each including the sharing user 402 "A" and one of the target users 404 "Bx", and for each of the n target users. In other words, the pairings 504 include (A, B1), (A, B2), . . . , (A, Bn). For each pairing 504, input data is identified for the pairing 504 (e.g., similar to as described in FIG. 5, along with feature engineering 540 and/or feature transformation 550). This input data is applied to the model 502 to generate an engagement value 620, Engagement$_x$, for each target user 404. The engagement values serve as the engagement factor.

Regarding the activity factor, in one embodiment, the activity analysis module 330 identifies a time window (e.g., the past week, or two weeks, or one month, or three months) within which to study the activity of the target users 404 (e.g., activity on the social network 200, as described below). Within that time window, the activity analysis module 330 may identify multiple sub-groups, such as multiple days (e.g., 30 sub-groups of days in the past one month), or multiple weeks (e.g., 4 sub-groups of weeks in the past one month). Within that time window, and optionally within the multiple sub-groups, the activity analysis module 330 further partitions the time window or the sub-groups into a set of time blocks 432, where each time block 432 has a length of time ("time block length") within the time window or the sub-group. For example, the time block length may be one hour, and may be aligned on the top of the hour (e.g., one time block 432 may be 8:00 AM-9:00 AM, and another may be 9:00 AM-10:00 AM). As such, a time window may be partitioned into multiple time blocks 432. For example, without sub-group pooling, a time window of the past 7 days, with one-hour time block lengths, may yield 7 days*24 time blocks/day=168 total time blocks 432. With sub-group pooling, a time window of the past 7 days, with sub-grouping based on days (e.g., 7 sub-groups, one for each day), and with one-hour time block lengths, may yield 24 time blocks, one for each hour of the day, within which each sub-group (e.g., each day) contributes to each of the time blocks (e.g., 7:00 AM-8:00 AM of "Day 1" is pooled together with 7:00 AM-8:00 AM of "Days 2 through 7").

For each target user 404, and for each time block 432 in the set of time blocks, the activity analysis module 330 evaluates the activity history for the target user 404 within that time block 432. In some embodiments, the activity history may be extracted from user activity data 610 (e.g., associated with the social network 200 and the social network system 210). More specifically, and for each target user 404, the activity analysis module 330 generates an activity value 622 for each time block 432 (either with or without sub-group pooling) based on the user activity data 610 for that target user 404 during that time block 432 (e.g., whether that target user 404 was active on the social network system 210 during that time block 432).

The activity analysis module 330 may evaluate user activity within a particular time block (e.g., compute the activity values 622) in one of many ways. In some embodiments, the activity analysis module 330 considers user activity in a binary fashion (e.g., either "active" or "not active" within a given time block), and based on an activity threshold factor. For example, in some embodiments, having an open session with the social network system 210 (e.g., logged into the social network 200) at any time during the time block may be considered "active" (an example activity threshold factor). In some embodiments, any site interaction event (e.g., clicking on a menu, scrolling on a window, clicking on an email, "liking" a content item of another member) performed by the target user on the social network system 210 during the time block may be considered "active" (the activity threshold factor). In some embodiments, a set of specific engagement events may be pre-defined as the activity threshold factor. For example, content item interaction events including one or more of "liking" a content item, sharing a content item, commenting on a content item, and clicking on a content item may be the specific engagement events that cause the target user to be considered "active" during the time block.

In other embodiments, the activity analysis module 330 considers user activity (e.g., compute the activity values 622) as a broader numerical value. For example, in some embodiments, the activity analysis module 330 may count the number of site interaction events, or the number of specific engagement events, performed by the target user within the time block. As such, and for example, the target user's activity level may be weighted higher when the target user is performing many site interaction events during the time block, or weighted lower when the target user performs only a few site interaction events during that time block.

In some embodiments, each time block may be evaluated individually (e.g., when computing the activity values 622). For example, presume a time window of the past 7 days, with one-hour time block lengths, with a bottom-of-the-hour alignment, and without sub-group pooling. As such, the activity analysis module 330 may generate one activity score for the Monday 7:30 am-8:30 am time block, and a second activity score for the Tuesday 7:30 am-8:30 am time block. In the example embodiment, each time block is pooled by day. For example, presume a time window of the past two weeks, sub-group pooling based on a single day, and one-hour time block lengths with a top-of-the-hour alignment (e.g., 7:00 AM-8:00 AM, 8:00 AM-9:00 AM, and so forth), as shown in FIG. 6. As such, the activity module 330 groups all of the 7:00 AM-8:00 AM activity of the target user 404 into a single activity value 622 for the 7:00 AM-8:00 AM time slot 432. In other words, the user activity data 610 for the target user 404 for 7:00 AM-8:AM across all 14 days is used to generate one activity value 622 for that time slot 432. As such, the activity analysis module 330 computes 24 activity values 622 for each target user 404, one for each of the 24 target blocks (e.g., one for each hour of the day). Further, in some embodiments, the time blocks may be weighted relative to their age. For example, yesterday's 7 am block may be weighted higher than the 7 AM block two days ago, which may have a higher weight than the 7 AM block three days ago, and so forth (e.g., decaying block weights). In some embodiments, the time blocks may be combined by day-of-week (e.g., day-of-week pooling). For example, the Monday 7 AM blocks from multiple weeks may be pooled together, and the Monday 8 AM blocks from multiple weeks may be pooled together, and so forth.

In other embodiments, the set of time blocks may be 3-hour time blocks (e.g., 6 am-9 am, 9 am-noon, and so forth), and may have different other alignments. In other embodiment, the set of time blocks may be half-hour time blocks (e.g., 7:00 am-7:30 am, 7:30 am-8:00 am, and so forth). In some embodiments, the windows may be overlapping. For example, the set of time blocks may be 3-hour time blocks starting at the top of every hour (e.g., 6:00 AM-9:00

AM, 7:00 AM-10:00 AM, 8:00 AM-11:00 AM, and so forth). Further, in other embodiments, the activity analysis module 330 may examine the past week of data, or the past two weeks, or the past 3 months (alternate example time window embodiments).

As such, each target user 404 has an associated engagement value 620 and a set of activity values 622 (e.g., one for each time block 432). Once the engagement value 620 and activity values 622 for each target user 404 are computed, the content propagation engine 206 (e.g., the comparison module 340) generates a time block score (not separately shown) for each time block 432 based on each set of engagement values 620 and activity values 622 for the target users 404.

More specifically, and for example, consider the 7:00 AM-8:00 AM time block 432. To compute the time block score for this time block, the comparison module 340 identifies each of the activity values 622 for that time block 432 from each target user 404. Each of those activity values 622 represent the activity of the associated target user 404 during the 7:00 AM-8:00 AM time block 432 (and may be over multiple days or weeks, if pooled). Each of the activity values 622 for that time block 432 are then weighted based on the associated engagement value 620 of that target user 404.

For example, presume n target users 404, and m time blocks 432, and where the variable x identifies a particular target user 404 (e.g., between 1 and n), and where the variable y identifies a particular time block 432 (e.g., between 1 and m). Also presume target user 404 "B1" (e.g., x=1) in the 7:00 AM-8:00 AM time block 432 (e.g., y=8) has an activity value, Activity$_{1,8}$=0.08 (e.g., active 8% of the time during that time block), and an engagement value, Engagement$_1$=0.60 (e.g., a 60% likelihood to engage based on this sharing event). As such, the comparison module 340 may multiply the activity value by the engagement value to generate a user-level score for that time block 432, and for that particular target user 404:

UserScore$_{x,y}$=Activity$_{x,y}$*Engagement$_x$, where x is the particular target user 404, Activity$_x$ is that target user's activity value 622 for this particular time block 432, and Engagement$_x$ is that target users's 404 engagement value 620. Thus, for user "B1", the user-level score for this time block 432 is:

UserScore$_{1,8}$=0.08*0.60=0.048, or, in other words, the user score is 0.048 for the 1$^{st}$ user in the 8$^{th}$ time block.

Similarly, the comparison module 340 generates user-level scores for all of the target users 404 for that 7:00 AM-8:00 AM time block (e.g., UserScore$_{1,8}$ to UserScore$_{n,8}$), where n is the number of target users 404 in the pool 406. The comparison module 340 then adds together all of the user-level scores for that time block and divides by the total number of target users 404 to generate the time block score for that time block, as such:

$$TimeBlockScore_y = \frac{\sum_{i=1}^{n} UserScore_{i,y}}{n},$$

where y is an identifier for one of the time blocks 432. As such, and presuming that the 7:00 AM-8:00 AM time block 432 is the 8$^{th}$ time block 432 (e.g., y=8), the time block score for the 7:00 AM-8:00 Am time block 432 is:

$$TimeBlockScore_8 = \frac{\sum_{i=1}^{n} UserScore_{i,8}}{n}.$$

As such, the comparison module 340 generates a time block score for each of the y time blocks 432 (e.g., TimeBlockScore$_1$, TimeBlockScore$_2$, . . . , TimeBlockScore$_y$).

In the example embodiment, the comparison module 340 then selects the time block having the largest time block score as the target time block 420. The comparison module 340 then determines a share time 422, or a time at which to execute the share event for the content item 410 with the target users 404. The share time 422 may be during the target time block 420 (e.g., at 8:15 AM, or 8:30 AM), or right at the start of the target time block 420 (e.g., at 8:00 AM), or at a pre-determined amount of time prior to the start of the target time block 420 (e.g., 10 minutes before 8:00 AM). In some scenarios, some target users 404 may be less likely to engage with content during active time blocks (e.g., because many other content items are competing for their attention). As such, in some embodiments, the comparison module 340 may also factor in a time lag between share time and engagement time as a factor for determining the share time 422.

In some embodiments, the comparison module 340 then schedules and/or executes the share event for the content item 410 (e.g., via the social network 200 or, more specifically, the social network system 210). As such, the selection of this target time block 420, and the share time 422, generally speaking, represents a time block 432 which may enhance exposure to the content item 410, balancing the likelihood of target users 404 being active on the social network 200 (e.g., via the activity values 622) along with the potential of each of those users 404 to engage (e.g., vial the engagement value 620). In some embodiments, a predetermined number of highest time blocks are determined (e.g., the best 3-5 time blocks). If the highest time block is scheduled to have high share volume already, then the comparison module 340 may select one of the other time blocks as the target time block 420. For example, presume 7 AM, 9 AM, and 2 PM time blocks were the highest scoring time blocks, in that order. However, the 7 AM time block already has many content items scheduled to be published, but the 9 AM block is relatively light. As such, the comparison module 340 may select the 9 AM bloc.

Figure 7:
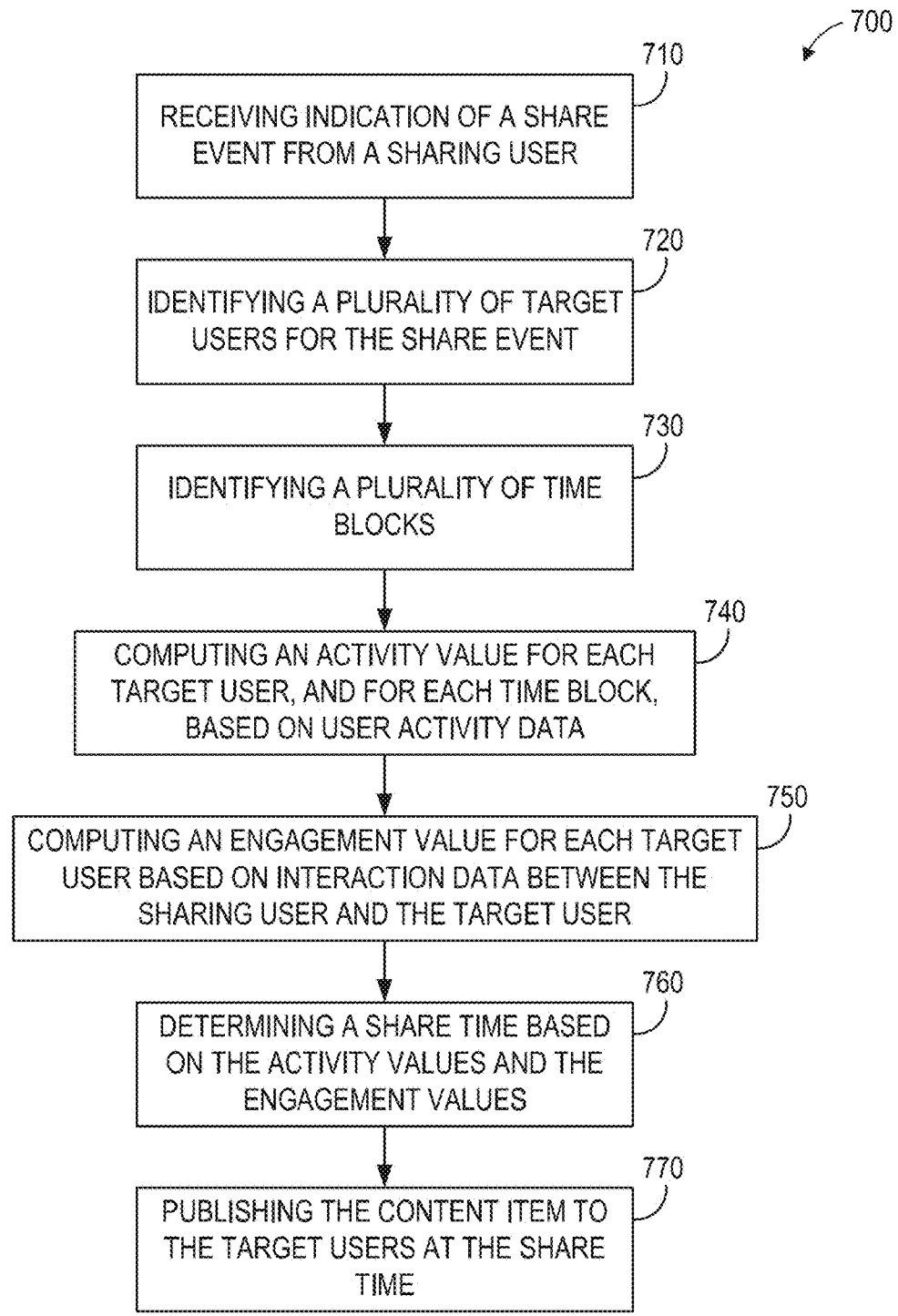
FIG. 7 is a flow chart illustrating operations of the content propagation engine in performing a method for determining a share time for a share event between a sharing user and multiple target users on a social network, according to various embodiments.

FIG. 7 is a flow chart illustrating operations of the content propagation engine 206 in performing a method 700 for determining a share time 422 for a share event between a sharing user 401 and multiple target users 404 on a social network 200, according to various embodiments. Operations in the method 700 may be performed by the network-based system 105, using modules described above with respect to FIG. 3. As shown in FIG. 7, the method 700 includes operations 710, 720, 730, 740, 750, 760, and 770.

At operation 710, the method 700 includes receiving an indication of a share event from a sharing user, the share event including a content item. At operation 720, the method 700 includes identifying a plurality of target users for the share event. At operation 730, the method 700 includes identifying a plurality of time blocks. At operation 740, the method 700 includes computing an activity value for each target user of the plurality of target users, and for each time block of the plurality of time blocks, the activity value is based on user activity data, from a memory, relating to activity of a plurality of target users on a social network, thereby generating a plurality of activity values. At operation 750, the method 700 includes computing an engagement value for each target user of the plurality of target users, the engagement value is based at least in part on interaction data relating to interactions between the sharing user and the target user on the social network, thereby generating a plurality of engagement values. At operation 760, the method 700 includes determining a share time based at least in part on the plurality of activity values and the plurality of engagement values, the share time being a time at which the content item is published to the plurality of target users. At operation 770, the method 700 includes publishing the content to the plurality of target users at the share time.

In some embodiments, the method 700 includes computing a time block score for each time block of the plurality of time blocks, wherein computing the time block score includes: for each target user of the plurality of target users, multiplying the activity value of the target user, and for the time block, by the engagement value of the target user, thereby generating a plurality of user-level scores for the time block; and summing the plurality of user-level scores to generate the time block score, thereby generating a plurality of time block scores, each time block of the plurality of time blocks having one time block score, wherein determining the share time further includes determining the share time based on the plurality of time block scores.

In some embodiments, the method 700 includes generating a plurality of pairings, each pairing including the sharing user and one target user of the plurality of target users, identifying input data associated with each pairing of the plurality of pairings, the input data including one or more of interaction data, shared content item data, and user profile data associated with the pairing, and applying the input data to a model, the model outputting the engagement value for the associated target user. In some embodiments, the method 700 includes identifying a target time block based at least in part on the plurality of activity values, wherein determining the share time is further based at least in part on the target time block.

In some embodiments, the method 700 includes identifying historical interaction data between the sharing user and a first target user, and training a model based at least in part on the historical interaction data between the sharing user and the first target user, wherein computing the engagement value further includes computing a first engagement value for the first target user using the model. In some embodiments, the historical interaction data between the sharing user and the first target user includes historical re-sharing of content, posted by the sharing user, by the first target user. In some embodiments, the historical interaction data between the sharing user and a first target user includes content items having one or more of a title and a description of the content items, and training the model is further based at least in part on the one or more of the title and the description of the content items.

Figure 8:
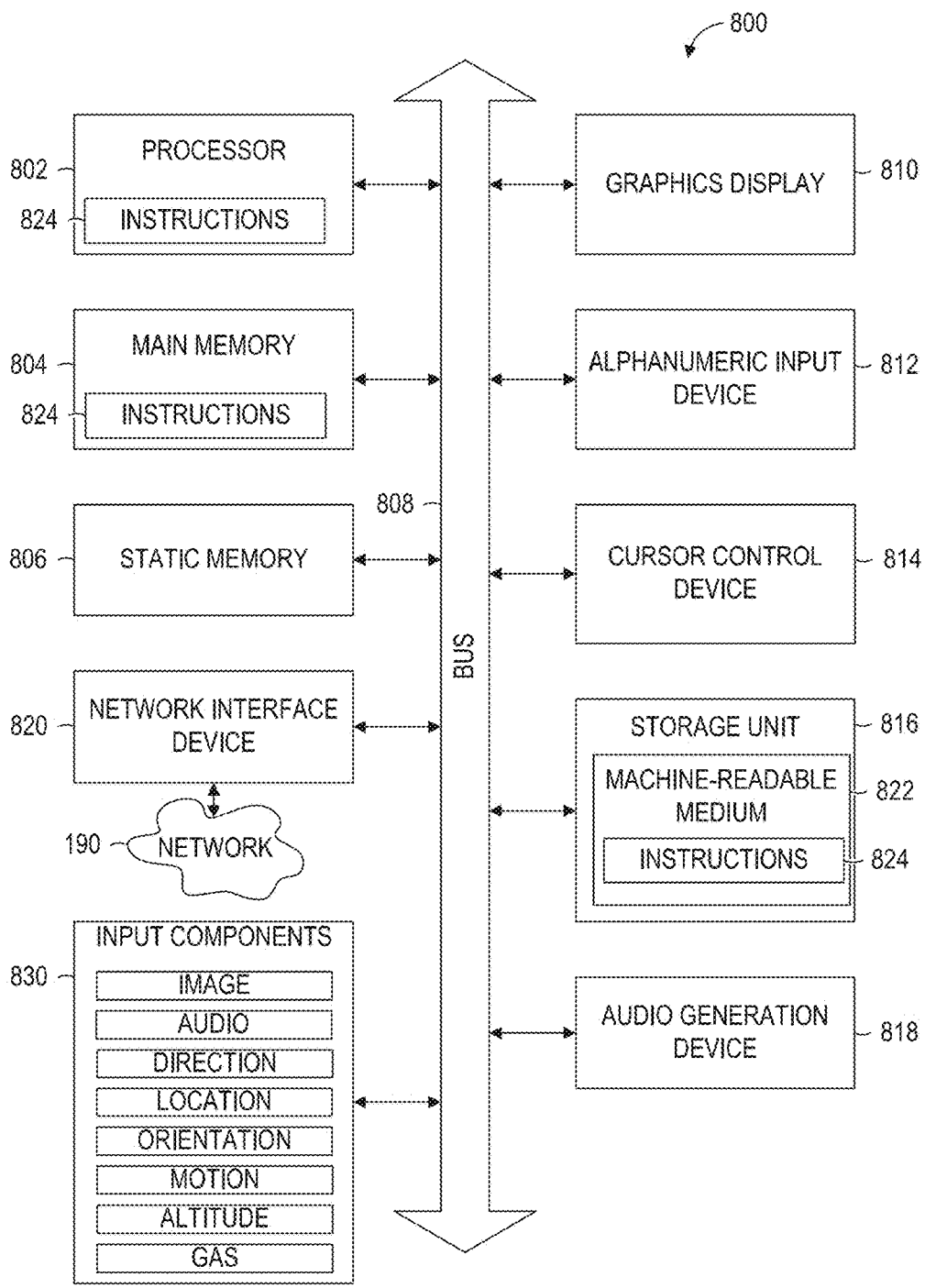
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions 824 from a machine-readable medium 822 (e.g., a non-transitory machine-readable medium, a machine-readable storage medium, a computer-readable storage medium, or any suitable combination thereof) and perform any one or more of the methodologies discussed herein, in whole or in part. In some embodiments, the machine 800 is similar to the networked system 105, or the social network system 210, or the content propagation engine 206. Specifically, FIG. 8 shows the machine 800 in the example form of a computer system (e.g., a computer) within which the instructions 824 (e.g., software, a program, an application, an applet, an app, or other executable code) for causing the machine 800 to perform any one or more of the methodologies discussed herein may be executed, in whole or in part. When configured as described herein, the machine 800 becomes a special-purpose machine 800 specifically configured to perform the systems and methods described herein.

In alternative embodiments, the machine 800 operates as a standalone device 130, 150 or may be connected (e.g., networked) to other machines. In a networked deployment, the machine 800 may operate in the capacity of a server machine 110 or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine 800 is illustrated, the term "machine" shall also be taken to include any collection of machines 800 that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or another pointing instrument), a storage unit 816, an audio generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media 822 (e.g., tangible and non-transitory machine-readable media). The instructions 824 may be transmitted or received over the network 190 via the network interface device 820. For example, the network interface device 820 may communicate the instructions 824 using any one or more transfer protocols (e.g., Hypertext Transfer Protocol (HTTP)).

In some example embodiments, the machine 800 may be a portable computing device, such as a smartphone or tablet computer, and may have one or more additional input components 830 (e.g., sensors or gauges). Examples of such input components 830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components 830 may be accessible and available for use by any of the modules described herein.

As used herein, the term "memory" refers to a machine-readable medium 822 able to store data temporarily or permanently and may be taken to include, but not be limited to, random-access memory (RAM), read-only memory (RUM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions 824. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, engines, or mechanisms. Modules or engines may constitute software modules (e.g., code stored or otherwise embodied on a machine-readable medium 822 or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors 802) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor 802 or other programmable processor 802. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor 802 configured by software to become a special-purpose processor, the general-purpose processor 802 may be configured as respectively different special-purpose processors (e.g., comprising different hardware modules) at different times. Software (e.g., a software module) may accordingly configure one or more processors 802, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses 808) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors 802 that are temporarily configured (e.g., by software) or permanently configured to perform the relevant operations. Whether temporarily or permanently configured, such processors 802 may constitute processor-implemented modules that operate to perform one or more operations or functions described herein. As used herein, "processor-implemented module" refers to a hardware module implemented using one or more processors 802.

Similarly, the methods described herein may be at least partially processor-implemented, a processor 802 being an example of hardware. For example, at least some of the operations of a method may be performed by one or more processors 802 or processor-implemented modules. As used herein, "processor-implemented module" refers to a hardware module in which the hardware includes one or more processors 802. Moreover, the one or more processors 802 may also operate to support performance of the relevant operations in a "cloud computing" environment or as a "software as a service" (SaaS). For example, at least some of the operations may be performed by a group of computers (as examples of machines 800 including processors 802), with these operations being accessible via a network 190 (e.g., the Internet) and via one or more appropriate interfaces (e.g., an application programming interface (API)).

The performance of certain operations may be distributed among the one or more processors 802, not only residing within a single machine 800, but deployed across a number of machines 800. In some example embodiments, the one or more processors 802 or processor-implemented modules may be located in a single geographic location (e.g., within a home environment, an office environment, or a server farm). In other example embodiments, the one or more processors 802 or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine 800. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine 800 (e.g., a computer) that manipulates or transforms data represented as physical (e.g., electronic, magnetic, or optical) quantities within one or more memories (e.g., volatile memory, nonvolatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A content propagation system comprising:
   one or more hardware processors;
   a memory storing:
      user activity data relating to activity of multiple target users on a social network; and
      interaction data relating to interactions between a sharing user and the target users on the social network; and
   a content propagation engine, executing on the one or more hardware processors, configured to:
      receive an indication of a share event from the sharing user, the share event including a content item;
      identify a plurality of target users for the share event;
      identify a plurality of time blocks;
      compute an activity value for each target user of the plurality of target users, and for each time block of the plurality of time blocks, the activity value is based on the user activity data, thereby generating plurality of activity values;
      compute an engagement value for each target user of the plurality of target users, the engagement value is based at least in part on the interaction data between the sharing user and the target user, thereby generating a plurality of engagement values;
      determine a share time based at least in part on the plurality of activity values and the plurality of engagement values, the share time being a time at which the content item is published to the plurality of target users; and
      publish the content item to the plurality of target users at the share time.

2. The content propagation system of claim 1, wherein the content propagation engine is further configured to:
   compute a time block score for each time block of the plurality of time blocks, wherein computing the time block score includes:
      for each target user of the plurality of target users, multiplying the activity value of the target user, and for the time block, by the engagement value of the target user, thereby generating a plurality of user-level scores for the time block; and
      summing the plurality of user-level scores to generate the time block score, thereby generating a plurality of time block scores, each time block of the plurality of time blocks having one time block score,
   wherein determining the share time further includes determining the share time based on the plurality of time block scores.

3. The content propagation system of claim 1, wherein the content propagation engine is further configured to:
   generate a plurality of pairings, each pairing including the sharing user and one target user of the plurality of target users;
   identify input data associated with each pairing of the plurality of pairings, the input data including one or more of interaction data, shared content item data, and user profile data associated with the pairing; and
   apply the input data to a model, the model outputting the engagement value for each associated target user.

4. The content propagation system of claim 1, wherein the content propagation engine is further configured to:

identify a target time block based at least in part on the plurality of activity values,
wherein determining the share time is further based at least in part on the target time block.

5. The content propagation system of claim 1, wherein the content propagation engine is further configured to:
identify historical interaction data between the sharing user and a first target user; and
train a model based at least in part on the historical interaction data between the sharing user and the first target user,
wherein computing the engagement value further includes computing a first engagement value for the first target user using the model.

6. The content propagation system of claim 5, wherein the historical interaction data between the sharing user and the first target user includes historical re-sharing of content, posted by the sharing user, by the first target user.

7. The content propagation system of claim 5, wherein the historical interaction data between the sharing user and the first target user includes content items having one or more of a title and a description of the content items, wherein training the model is further based at least in part on the one or more of the title and the description of the content items.

8. A computer-implemented method comprising:
receiving an indication of a share event from a sharing user, the share event including a content item;
identifying a plurality of target users for the share event;
identifying a plurality of time blocks;
computing an activity value for each target user of the plurality of target users, and for each time block of the plurality of time blocks, the activity value is based on user activity data, from a memory, relating to activity of a plurality of target users on a social network, thereby generating a plurality of activity values;
computing an engagement value for each target user of the plurality of target users, the engagement value is based at least in part on interaction data relating to interactions between the sharing user and the target user on the social network, thereby generating a plurality of engagement values;
determining a share time based at least in part on the plurality of activity values and the plurality of engagement values, the share time being a time at which the content item is published to the plurality of target users; and
publishing the content item to the plurality of target users at the share time.

9. The method of claim 8, further comprising:
computing a time block score for each time block of the plurality of time blocks, wherein computing the time block score includes:
for each target user of the plurality of target users, multiplying the activity value of the target user, and for the time block, by the engagement value of the target user, thereby generating a plurality of user-level scores for the time block; and
summing the plurality of user-level scores to generate the time block score, thereby generating a plurality of time block scores, each time block of the plurality of time blocks having one time block score,
wherein determining the share time further includes determining the share time based on the plurality of time block scores.

10. The method of claim 8, further comprising:
generating a plurality of pairings, each pairing including the sharing user and one target user of the plurality of target users;
identifying input data associated with each pairing of the plurality of pairings, the input data including one or more of interaction data, shared content item data, and user profile data associated with the pairing; and
applying the input data to a model, the model outputting the engagement value for each associated target user.

11. The method of claim 8, further comprising:
identifying a target time block based at least in part on the plurality of activity values,
wherein determining the share time is further based at least in part on the target time block.

12. The method of claim 8, further comprising:
identifying historical interaction data between the sharing user and a first target user; and
training a model based at least in part on the historical interaction data between the sharing user and the first target user,
wherein computing the engagement value further includes computing a first engagement value for the first target user using the model.

13. The method of claim 12, wherein the historical interaction data between the sharing user and the first target user includes historical re-sharing of content, posted by the sharing user, by the first target user.

14. The method of claim 12, wherein the historical interaction data between the sharing user and the first target user includes content items having one or more of a title and a description of the content items, wherein training the model is further based at least in part on the one or more of the title and the description of the content items.

15. A non-transitory machine-readable medium storing processor-executable instructions which, when executed by one or more processors, cause the one or more processors to:
receive an indication of a share event from a sharing user, the share event including a content item;
identify a plurality of target users for the share event;
identify a plurality of time blocks;
compute an activity value for each target user of the plurality of target users, and for each time block of the plurality of time blocks, the activity value is based on user activity data relating to activity of a plurality of target users on a social network, thereby generating a plurality of activity values;
compute an engagement value for each target user of the plurality of target users, the engagement value is based at least in part on interaction data relating to interactions between the sharing user and the target user on the social network, thereby generating a plurality of engagement values;
determine a share time based at least in part on the plurality of activity values and the plurality of engagement values, the share time being a time at which the content item is published to the plurality of target users; and
publish the content item to the plurality of target users at the share time.

16. The machine-readable medium of claim 15, wherein the processor-executable instructions further cause the one or more processors to:
generate a plurality of pairings, each pairing including the sharing user and one target user of the plurality of target users;
identify input data associated with each pairing of the plurality of pairings, the input data including one or more of interaction data, shared content item data, and user profile data associated with the pairing; and apply the input data to a model, the model outputting the engagement value for each associated target user.

17. The machine-readable medium of claim 15, wherein the processor-executable instructions further cause the one or more processors to:

identify a target time block based at least in part on the plurality of activity values, wherein determining the share time is further based at least in part on the target time block.

18. The machine-readable medium of claim 15, wherein the processor-executable instructions further cause the processor to:

compute a time block score for each time block of the plurality of time blocks, wherein computing the time block score includes:

for each target user of the plurality of target users, multiplying the activity value of the target user, and for the time block, by the engagement value of the target user, thereby generating a plurality of user-level scores for the time block; and summing the plurality of user-level scores to generate the time block score, thereby generating a plurality of time block scores, each time block of the plurality of time blocks having one time block score, wherein determining the share time further includes determining the share time based on the plurality of time block scores.

19. The machine-readable medium of claim 15, wherein the processor-executable instructions further cause the one or more processors to:

identify historical interaction data between the sharing user and a first target user; and train a model based at least in part on the historical interaction data between the sharing user and the first target user, wherein computing the engagement value further includes computing a first engagement value for the first target user using the model.

20. The machine-readable medium of claim 19, wherein the historical interaction data between the sharing user and the first target user includes content items having one or more of a title and a description of the content items, wherein training the model is further based at least in part on the one or more of the title and the description of the content items.

\* \* \* \* \*